United States Patent
Dils

(10) Patent No.: US 6,543,324 B2
(45) Date of Patent: *Apr. 8, 2003

(54) TABLE SAW THROAT PLATE WITH BLADE HEIGHT SCALE

(75) Inventor: Jeffrey M. Dils, Phoenix, AZ (US)

(73) Assignee: One World Technologies, Inc., Anderson, SC (US)

(*) Notice: Subject to any disclaimer, the term of this patent is extended or adjusted under 35 U.S.C. 154(b) by 0 days.

This patent is subject to a terminal disclaimer.

(21) Appl. No.: 09/836,959

(22) Filed: Apr. 17, 2001

(65) Prior Publication Data

US 2001/0013268 A1 Aug. 16, 2001

Related U.S. Application Data

(62) Division of application No. 09/249,030, filed on Feb. 12, 1999, now Pat. No. 6,216,575.

(51) Int. Cl.⁷ .................................................. B27B 5/20
(52) U.S. Cl. .................. 83/522.17; 83/477.1; 83/477.2; 33/640
(58) Field of Search ...................... 83/471.3, 477.1, 83/477.2, 477, 522.19, 522.18, 522.16, 522.17; 144/286.1, 286.5; 33/640

(56) References Cited

U.S. PATENT DOCUMENTS

| | | | |
|---|---|---|---|
| 420,739 A | | 2/1890 | Schmitz |
| 2,208,582 A | | 7/1940 | Hollister |
| 3,205,586 A | | 9/1965 | Mullen |
| 3,386,482 A | | 6/1968 | Nadeau |
| 3,628,496 A | | 12/1971 | Schmitt |
| 4,249,442 A | | 2/1981 | Fittery |
| 4,408,509 A | * | 10/1983 | Wlnchip ............... 83/435.1 |
| 4,483,573 A | | 11/1984 | Keller |
| 4,754,276 A | | 6/1988 | Carlson et al. |
| 4,779,354 A | | 10/1988 | Hill |
| 5,016,509 A | | 5/1991 | Stottman |
| 5,121,553 A | | 6/1992 | Boerder |
| 5,159,864 A | | 11/1992 | Wedemeyer et al. |
| 5,168,637 A | | 12/1992 | Gibson |
| 5,495,784 A | | 3/1996 | Chen |
| 6,216,575 B1 | * | 4/2001 | Dils ..................... 83/522.17 |

* cited by examiner

Primary Examiner—Boyer D. Ashley
(74) Attorney, Agent, or Firm—Brooks & Kushman P.C.

(57) ABSTRACT

A throat plate insert for a table saw is provided having a scale on the upper side thereof adjacent the region of the elongated slot for the circular saw blade. The scale provides an indication of the height of a specified diameter saw blade corresponding to the chordal length of a segment of saw blade protruding through the elongate slot.

9 Claims, 2 Drawing Sheets

TABLE SAW THROAT PLATE WITH BLADE HEIGHT SCALE

This is a divisional of application(s) Ser. No. 09/249,030 filed on Feb. 12 1999, now U.S. Pat. No. 6,216,575.

TECHNICAL FIELD

The present invention relates to throat plates for table saws.

BACKGROUND ART

Table saws are typically provided with a relatively large recessed throat opening in the table top surface through which the circular saw blade projects at various heights and angles selected by the user. The throat opening is typically filled by a throat plate insert which can be easily removed and changed as necessary. Most commonly, the original equipment of a throat plate provided with a table saw will have an elongated slot extending there through, somewhat larger than the kerf of the blade and having an elongate slot length slightly greater than the maximum chordal length of the portion of the saw blade extending above the saw table top surface at maximum height. The width of the elongate slot is typically larger than a conventional blade so that a table saw operator can install a thicker blade such as a carbide tip rip blade without interference. When a very thin kerf blade is installed, particularly at low blade height, very little of the elongated slot is filled with the portion of the blade extending above the height of the table which can pose a problem when cutting thin veneers or materials which easily chip. To address this problem, after market throat plates are available without any elongated slot formed therein at the time of the purchase. The user installs the throat plate on a table saw with the saw fully retracted and with the saw blade rotating raises the blade through the throat plate forming an elongate slot in situ. This type of throat plate is referred to as a "zero clearance throat plate".

Zero clearance throat plates are particularly useful when installing nonstandard diameter saw blades such as a dado head cutter which cuts slots having widths ranging from 1/8" to 3/16". Dado head cutters are frequently used to cut a groove in a workpiece having a precise width and depth. The width of cut is determined by the dado blade adjustment. The depth of the cut into the workpiece is determined by the blade height relative to the table. Blade height is typically set using a scale or blade height setting tool with a series of stepped notches formed therein. Accurately setting can be a tedious process frequently requiring trial and error and several iterations with requiring the user to make an initial cut, checking cut depth and adjusting accordingly.

DISCLOSURE OF INVENTION

It is an object of the present invention to provide a simple and accurate device for setting the height of a circular saw blade without the need for additional tools and scales.

Accordingly, a table saw is provided having a table saw top surface with a recessed throat opening formed therein. A motor driven circular saw blade is oriented below the table top surface and is positionable in various orientations relative to the saw table so a portion of the saw blade projects through the recessed throat opening. A throat plate insert is installed in the recessed throat opening of the table saw top surface through which the rotary circular saw blade projects at a height which is adjustable by the operator. The throat plate is made up of a general planar plate member having a generally flat surface flush with the table saw top surface, and an outer peripheral shape corresponding to the throat plate opening in the table saw top surface in a centrally elongated slot sized to receive the saw blade there through. The plate member has a scale on the upper surface adjacent the region of the elongate slot with the scale providing an indication of the height of a specified diameter saw blade corresponding to the chordal length of the segment of the saw blade which protrudes through the elongate slot, thereby enabling the operator to adjust the height of the saw blade accurately without the use of additional tools.

BEST MODE FOR CARRYING OUT THE INVENTION

Figure 1:
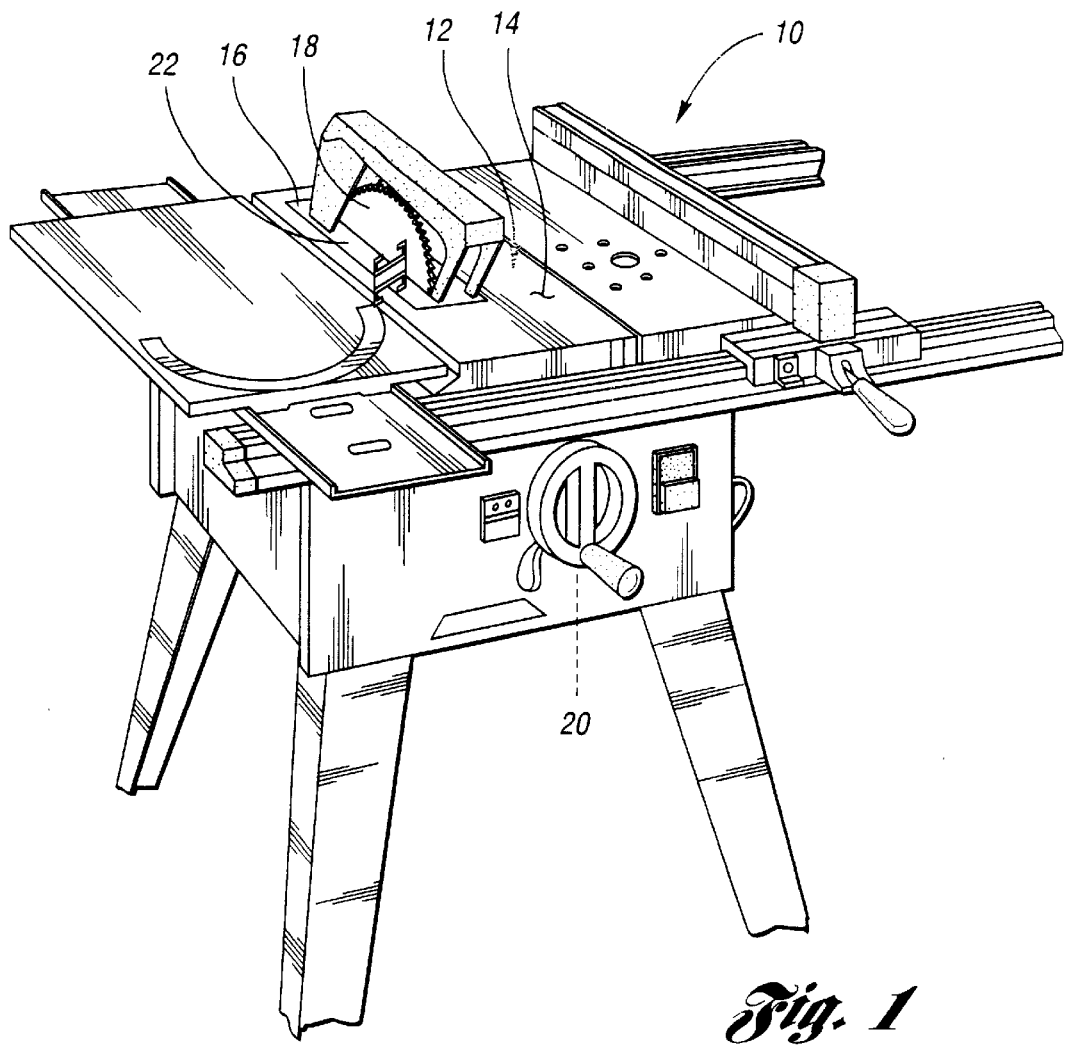
FIG. 1 depicts a table saw utilizing the present invention.

FIG. 1 illustrates a table saw 10 incorporating the present invention. Table saw 10 is provided with a table top member 12 having a top surface 14 for supporting a workpiece to be cut. Table top surface 14 is further provided with a recessed open throat opening 16 formed there through. Below top surface 14 of table saw 10 is a motor drive mechanism not shown for rotating circular saw blade 18. Circular saw blade 18 is adjustable by an operator using hand wheel 20 in order to vary the height of circular saw blade 18 relative to the table top, thereby varying the amount of circular saw blade 18 which projects through recessed opening throat 16.

Figure 2:
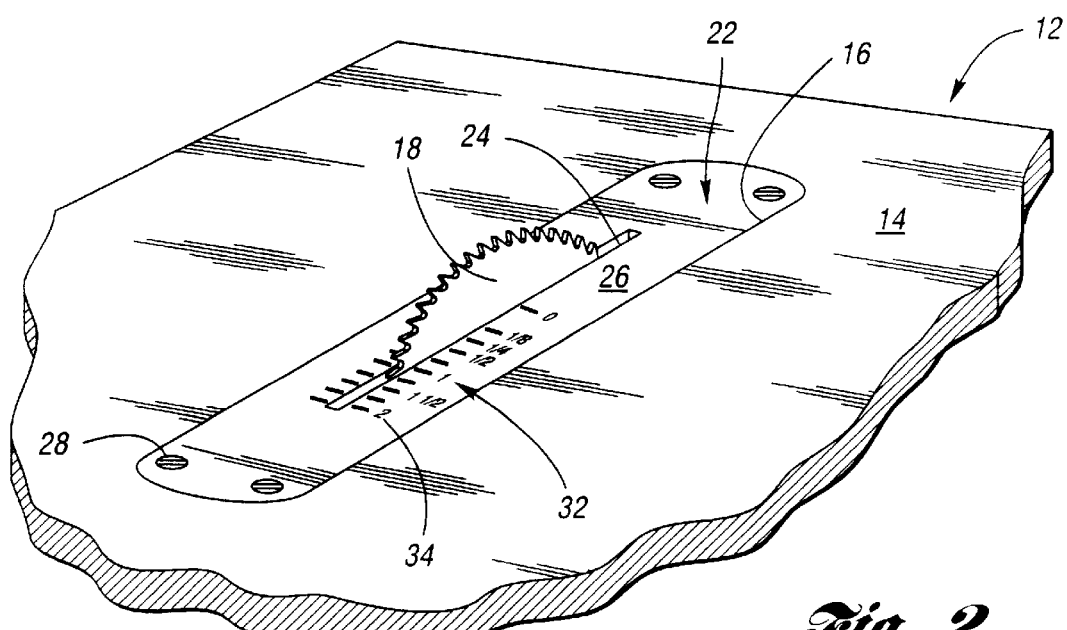
FIG. 2 is an enlarged view of a table saw having a throat plate of the present invention installed therein.

A throat plate 22, best seen in FIG. 2, fits within the recessed open throat 16 to generally fill the space between the periphery of the open throat 16 and saw blade 18. Throat plate insert 22 is provided with elongate slot 24 having a sufficient width, length to accommodate saw blade 18 throughout its range of normal travel. Throat plate insert 22 is formed of a plate member, preferably a plastic sheet having upper surface 26 which is generally coplanar with the top surface 14 of table top 12. Typically, the recessed throat opening 16 will have a stepped lip upon which the peripheral edge of the throat plate will rest. Fasteners such as screws 28 project through openings 30 formed in the throat plate (shown in FIG. 3) for securely retaining the throat plate 22 mounted to the table top 12. Throat plate 22 is provided with a scale 32 having indicia 34 which provides an indication of the height of a specific diameter saw blade above the table top, based upon the chordal length of the segment of the saw blade protruding through the elongate slot. For example, in FIG. 2, the scale positioned at the right hand side of saw blade 18, indicates that the height of the saw blade is approximately 1¼" above the table top.

It should be appreciated that the scale must correspond to the diameter of the saw blade. Multiple scales are preferably provided so that the user can switch the saw blades and still have the capability of measuring blade height using the single throat plate. Alternatively, in the cases where a zero clearance throat plate is sold without any slot yet formed therein, up to four different scales can be placed in different quadrants of the throat plate for four different diameter saw blades. In the example throat plate shown in FIG. 3, scales for 10", 8½", 7" and 6" saw blades are provided. 10" and 8½" saw blades being conventional blade diameters used in table saws, while 6" and 7" diameter saw blades are typical for dado head cutters. Of course, any number of different scales can be used depending upon the unit convention, i.e. metric or English for blade diameters required. Ideally, the indicia is imprinted on the upper surface of the throat plate in such a manner so that it does not easily become worn off in use. Preferably, the throat plate is formed of plastic using an injection molding process. If the throat plate is to be injection molded, it is very simple to mold indicia into the throat plate as a series of recesses in order to make the indicia quite visible and capable of withstanding severe wear.

Figure 3:
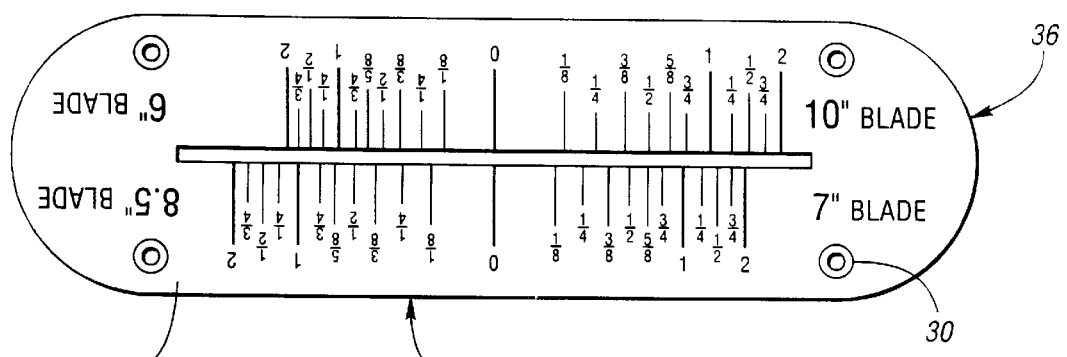
FIG. 3 is a top plan view of an alternative embodiment of the throat plate.

FIG. 3 illustrates a throat plate 36 provided with four different scales; one scale in each of the four quadrants. As can be seen in FIG. 3, the scale for a 10" blade is substantially longer than that for a 6" blade for the same blade height measurement. The relationship between the chordal length and the height of the blade is a trigo metric functions defined by the following equation:

$$\frac{l}{2} = r\left(2\left(\frac{h}{r}\right) - \left(\frac{h}{r}\right)^2\right)^{1/2}$$

where 1 is equal to the chordal length, r the blade diameter and h the blade height.

The above equation is solved for a series of different blade heights and blade diameters in the following table:

| Blade Height | Cord Half Length Blade Diameter | | | | |
|---|---|---|---|---|---|
| | 10.0 | 8.5 | 8.0 | 7.0 | 6.0 |
| 0.125 | 1.111 | 1.023 | 0.992 | 0.927 | 0.857 |
| 0.250 | 1.561 | 1.436 | 1.392 | 1.299 | 1.199 |
| 0.375 | 1.900 | 1.746 | 1.691 | 1.576 | 1.452 |
| 0.500 | 2.179 | 2.000 | 1.936 | 1.803 | 1.658 |
| 0.625 | 2.421 | 2.219 | 2.147 | 1.996 | 1.833 |
| 0.750 | 2.634 | 2.411 | 2.332 | 2.165 | 1.984 |
| 0.875 | 2.826 | 2.583 | 2.497 | 2.315 | 2.118 |
| 1.000 | 3.000 | 2.739 | 2.646 | 2.449 | 2.236 |
| 1.125 | 3.160 | 2.880 | 2.781 | 2.571 | 2.342 |
| 1.250 | 3.307 | 3.010 | 2.905 | 2.681 | 2.437 |
| 1.375 | 3.444 | 3.130 | 3.018 | 2.781 | 2.522 |
| 1.500 | 3.571 | 3.240 | 3.122 | 2.872 | 2.598 |
| 1.625 | 3.689 | 3.342 | 3.219 | 2.955 | 2.666 |
| 1.750 | 3.800 | 3.437 | 3.307 | 3.031 | 2.727 |
| 1.875 | 3.903 | 3.524 | 3.389 | 3.100 | 2.781 |
| 2.000 | 4.000 | 3.606 | 3.464 | 3.162 | 2.828 |
| 2.250 | 4.176 | 3.750 | 3.597 | 3.269 | 2.905 |
| 2.500 | 4.330 | 3.873 | 3.708 | 3.354 | 2.958 |
| 2.750 | 4.465 | 3.976 | 3.800 | 3.419 | 2.990 |

Figure 4:
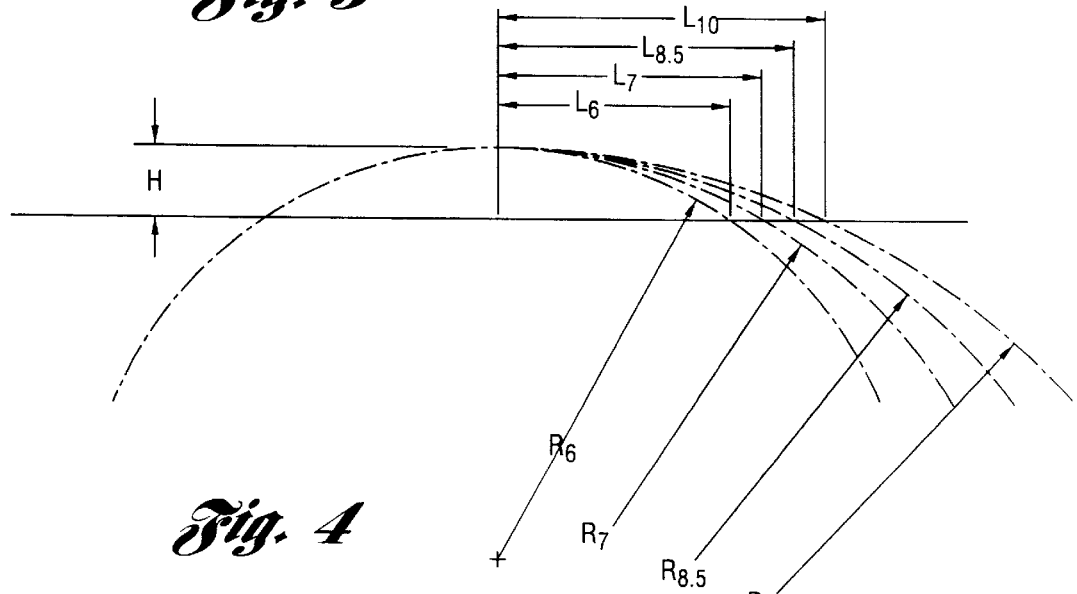
FIG. 4 is a schematic side elevation illustrating the effect of blade diameter changes.

The affect of varying blade diameter for a given blade height is illustrated in the above table as well as in FIG. 4. Four different blade sizes are illustrated shown by radius $R_6$, $R_7$ and $R_{8.5}$ and $R_{10}$. For a given blade height h, the chordal ½ length varies with chordal ½ length $L_6$ being the smallest by the ½ length for a 6" diameter blade and chordal ½ length $L_{10}$ being the longest with the 7" blade and 8½" blade being oriented there between accordingly.

Figure 5:
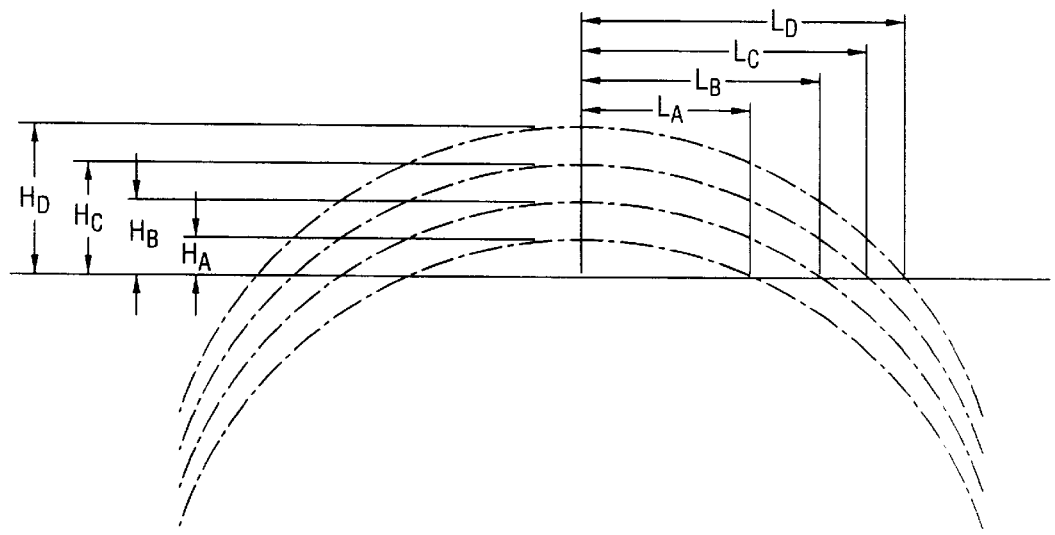
FIG. 5 is a schematic side elevation illustrating the effect of blade height on the length of the chordal segment of the blade which protrudes above the saw table top surface.

In FIG. 5, the affect on raising the blade to a range of heights, $H_A$ being the lowest and $H_D$ being the highest; illustrates the associated change in the cord half length $L_A$ being the smallest and chord half $L_D$ being the greatest. It should be appreciated that the relationship between blade height and cord half length is nonlinear as can be seen from the relationship between H and L in FIG. 5, the non linear scales in FIG. 3 and from the above equation and data table.

Typically, when a user is cutting a groove using a table saw with the blade set above the table top area at a pre-described height, grooves are typically relatively shallow in the ⅜" to ¾" range. In this range of operation, quarter length changes faster than height, therefore, there is some "magnification" in the quarter length as opposed to directly measuring blade height. This magnification affect is greatest at low blade height.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A throat plate insert for installation in a recessed throat opening in a table saw top surface through which a rotary circular saw blade projects at a height which is adjustable by an operator, a throat plate comprising:

a generally planar plate member having a substantially flat upper surface, an outer peripheral shape generally corresponding to the throat opening of the table saw top surface and a thickness which enables the plate member to be installed in the throat opening with the plate member upper surface generally flush with the table saw top surface;

wherein the plate member installed in the throat opening of the table saw top surface is cut in situ by the saw blade to form an elongate slot corresponding to the width of the saw blade; and the plate member having a permanent non-removable scale on the upper surface thereof, located on a region adjacent the elongate slot and generally flush with the table saw top surface, the scale having indicia providing an indication of the height of a specific diameter saw blade corresponding to a chordal length of a segment of the saw blade protruding through the elongate slot, thereby enabling the operator to accurately adjust the height of the saw blade without additional components oriented above the table saw top surface to directly measure blade height.

2. The throat plate of claim 1 wherein the plate member is provided with a plurality of scales imprinted on the upper surface adjacent different regions of the elongate slot, each scale corresponding to a different diameter saw blade thereby enabling the operator to utilize the throat plate with saw blades of different diameters.

3. The throat plate of claim 1 wherein the planar member is provided with four different scales corresponding to four different blade diameters each scale being located in a different quadrant defined by the elongated slot and a transverse center line of the blade, thereby enabling the throat plate to be utilized with saw blades of four different diameters.

4. The throat plate of claim 1 wherein the plate member is made of plastic utilizing an injection molding process with the indicia of the scale recessed molded into the upper surface of the plate member.

5. A throat plate insert for installation in a recessed throat opening in a table saw top surface through which a rotary circular saw blade projects at a height which is adjustable by an operator, a throat plate comprising:

a generally planar plate member having a substantially flat upper surface, an outer peripheral shape generally corresponding to the throat opening of the table saw top surface and a thickness which enables the plate member to be installed in the throat opening with the plate member upper surface generally flush with the table saw top surface;

the plate member having an elongated slot formed therein with a width sufficient to enable the saw blade to pass therethrough and a length which equals or exceeds a maximum chordal length of a segment of the saw blade protruding through the elongate slot at a maximum saw blade height; and the plate member having a permanent non-removable scale on the upper surface thereof, located on a region adjacent the elongate slot and generally flush with the table saw top surface, the scale having indicia providing an indication of the height of a specific diameter saw blade corresponding to the chordal length of the segment of the saw blade protruding through the elongate slot, thereby enabling the operator to accurately adjust the height of the saw blade without additional components oriented above the table saw top surface to directly measure blade height.

6. The throat plate of claim 5, wherein the planar member is further provided with a series of apertures formed there through for receiving fasteners for removably attaching the throat plate to the table saw.

7. The throat plate of claim 5, wherein the plate member is provided with a plurality of scales imprinted on the upper surface adjacent different regions of the elongate slot, each scale corresponding a different diameter saw blade thereby enabling the operator to utilize the throat plate with saw blades of different diameters.

8. The throat plate of claim 7 wherein the planar member is provided with four different scales corresponding to four different blade diameters each scale being located in a different quadrant defined by the elongated slot and a transverse center line of the blade, thereby enabling the throat plate to be utilized with saw blades of four different diameters.

9. The throat plate of claim 5 wherein the plate member is made of plastic utilizing an injection molding process with the indicia of the scale recessed into the upper surface thereof.

* * * * *